United States Patent [19]

Tawada et al.

[11] Patent Number: 4,937,550
[45] Date of Patent: Jun. 26, 1990

[54] STRAIN SENSOR

[75] Inventors: Yoshihisa Tawada, Kobe; Minori Yamaguchi, Akashi; Yoichi Hosokawa; Tomoyoshi Zenki, both of Kobe, all of Japan

[73] Assignee: Kanegafuchi Kagaku Kogyo Kabushiki Kaisha, Osaka, Japan

[21] Appl. No.: 295,969
[22] PCT Filed: Mar. 30, 1988
[86] PCT No.: PCT/JP88/00320
  § 371 Date: Jan. 27, 1989
  § 102(e) Date: Jan. 27, 1989

[30] Foreign Application Priority Data

Mar. 31, 1987 [JP] Japan ................... 62-80547

[51] Int. Cl.$^5$ .................................................. G01L 1/22
[52] U.S. Cl. .............................................. 338/2; 338/5
[58] Field of Search ........................................ 338/2-5

[56] References Cited

U.S. PATENT DOCUMENTS 3,186,217 6/1965 Pfann .................................. 338/5 X
4,766,008 8/1980 Kodato ............................ 427/295 X
4,835,059 5/1989 Kodato ................................. 338/2 X

FOREIGN PATENT DOCUMENTS 57-21813  2/1982 Japan.
57-67020  4/1982 Japan.
58-139475 8/1983 Japan.
60-195402 10/1985 Japan.
61-63064  4/1986 Japan.

Primary Examiner—George H. Miller, Jr.
Assistant Examiner—Marvin M. Lateef
Attorney, Agent, or Firm—Armstrong, Nikaido, Marmelstein, Kubovcik & Murray

[57] ABSTRACT

The present invention relates to a strain sensor, particularly a strain sensor which detects a mechanical strain using the electric resistance change of a non-single crystalline semiconductor which is proportional to mechanical strain. The strain sensor in the present invention consists of a non-single crystalline semiconductor containing Si wherein the activation energy determined from the temperature dependency of the dark conductivity is under 15 meV. The strain sensor particularly suits an application to a mechanical strain measurement under a comparatively strong magnetic field.

8 Claims, 1 Drawing Sheet

STRAIN SENSOR

DESCRIPTION

1. Technical Field

The present invention relates to a strain sensor, and more particularly relates to a strain sensor which detects a strain using a mutual relationship between strain and the resistance of a non-single crystal semiconductor containing Si.

2. Background Art

As conventional strain sensors, there are known sensors in which foils or thin wires comprising Cu-Ni alloy, Cu-Ni-Al alloy and the like; crystal semiconductors; or amorphous silicons are used as thermoelectric converters.

However, the strain sensors in which foils or thin wires are used, have drawbacks such as the ratio of resistance change against strains, i.e. the gage ratio, is small, i.e. 2 to 4, so that amplifiers are required for amplification; and noise becomes large when they are used under a comparatively strong magnetic field, for example, in the range of about 1 to about 10 tesla.

On the other hand, crystal semiconductors strain sensors have a benefit that the gage ratio is large, i.e. about 100. However, they have drawbacks such as the value of resistance largely changes in accordance with the change of temperature, in addition since the change of value is non-linear, complex thermal compensation circuits are required; and crystal semiconductors cannot be used under a comparatively strong magnetic field, for example, in the range of about 1 to about 10 tesla.

Also, amorphous Si strain sensors have a benefit that the absolute value of the gage ratio is comparatively large, i.e. 20 to 40. However, they have drawbacks such as the value of resistance is liable to change in accordance with a change of the temperature since activation energy is high, i.e. about 20 meV or more; and they are easily influenced by a magnetic field, so that they canot be used in a comparatively strong magnetic field, for example, in the range of about 1 to about 10 tesla.

It is an object of the present invention to solve the above-mentioned drawbacks of the conventional strain sensors. Namely, it is an object of the present invention to provide a strain sensor, wherein the gage ratio of G is large, the change of value of resistance in accordance with a change of the temperature is small, and the strain sensor can be used under a comparatively strong magnetic field.

DISCLOSURE OF THE INVENTION

A strain sensor of the present invention consists of a non-single crystal semiconductor containing Si, wherein activation energy determined from temperature dependency of dark conductivity is less than 15 meV. The strain sensor of the present invention has characteristics such as no amplifier is required for amplification since an absolute value of the gage ratio of G is large, no thermal compensation is required since the influence of the change of temperature against the value of resistance is small, and the strain sensor is applicable to measurement of strains under a comparatively strong magnetic field.

BEST MODE FOR CARRYING OUT THE INVENTION

Figure 1:
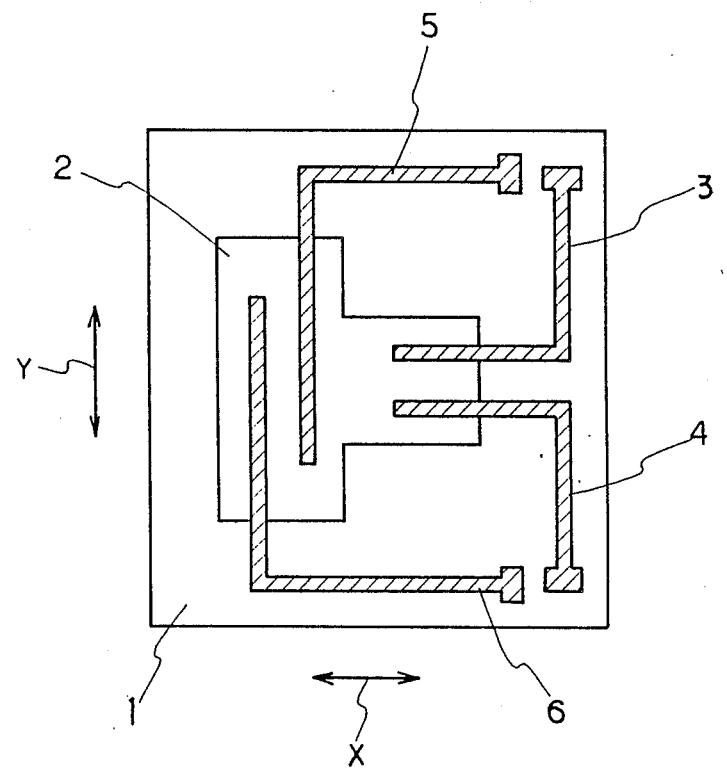
FIG. 1 is an explanatory illustration of an embodiment of a strain sensor of the present invention.

In the present description, a semiconductor containing Si represents a semiconductor which contains Si in the range of 99.5 to 1% by atom, preferably about 95 to about 50% by atom.

When the contained Si becomes less than 1% by atom, it is not preferable that a hopping conduction tends to occur. On the other hand, when the contained Si exceeds 99.5% by atom, it is not preferable that the change of the temperature tends to become large.

As components which compose the semiconductor, Ge semiconductor materials such as, Sn and the like can be used with the exception of Si. The semiconductor materials may be used alone, or two or more than two of of the semiconductor materials may be used together. Among the semiconductors, the semiconductors which contain at least either Ge or Sn are preferable, since the temperature dependency of conductivity becomes so small that no thermal compensation circuit is required, and the gage ratio becomes large.

The content of Ge and Sn in the semiconductor is preferably in the range of 0.5 to 99% by atom, and more preferably in the range of 5 to 50% by atom. When the content of Ge and Sn is within the above-mentioned range, it is preferable that strains are measured in a wide range of temperatures, i.e. minus 100° to plus 100° C. without thermal compensation, and it is preferble that the gage ratio becomes large.

A semiconductor to be used for the present invention may contain one or more than one element selected from H, F, Cl, Br, I and the like, which are contained in normal silicon as component(s) thereof except for the above-mentioned components. It is preferable that H and F among them are contained in the semiconductor since the resistivity of the semiconductor tends to become low.

It is preferable that the semiconductor contains H or F preferably in the range of 3 to 20% by atom as a component thereof, since the activation energy tends to become small when it is doped by dopants of elements from group III or group V of the periodic table.

A semiconductor to be used for the present invention, is a non-single crystal semiconductor of which activation energy determined from temperature dependency of dark conductivity is less than 15 meV, preferably 8 meV.

It is not preferable that the thermal compensation the gage ratio of G is required when the activation energy of dark conductivity of the semiconductor exceeds 15 meV. Particularly, it is preferable that no thermal compensation is required when the activation energy is less than 8 meV.

The activation energy determined from temperature dependency of dark conductivity means $\Delta E$ is defined by the formula:

$$\sigma = \sigma_0 \exp(\Delta E/kT)$$

for dark conductivity of semiconductor, and the activation energy is determined by the relationship between the temperature and the conductivity. In the present invention, it is determined by measuring them in the range of room temperature to 100° C.

Non-single crystal semiconductors in the present description represent a concept which include amorphous semiconductors; semiconductors containing noncrystal semiconductors comprising micro crystals (for example, crystals of 50 to 1000 Å) and amorphous semiconductors; and non-single crystal semiconductors.

When a semiconductor, to be used for the present invention, contains a non-single crystal semiconductor and an amorphous semiconductor, the ratio of the crystal phase (i.e. the proposition of non-single crystal semiconductor to amorphous semiconductor) contained in the semiconductor is preferably in the range of 5 to 90% by volume in order to reduce the influence, which is given to the gage ratio of G by a magnetic field, to the degree that the influence is substantially neglected; and particularly preferable that the ratio of the crystal phase is in the range of 5 to 25% by volume since the ratio of fluctuation of measured values is smaller than 10% even if it is used under a magnetic field in the range of 2 to 12 tesla. The ratio of the crystal phase is determined by X-ray diffraction analysis.

The size of the crystals comprising the above-mentioned crystal phase is preferably in the range of 50 to 1000 Å, and more preferably 150 to 400 Å.

When the size of the crystals become under 50 Å, the activation energy tends to become large. On the other hand, when the size exceeds 1000 Å, it tends to be influenced by the magnetic field.

As to the type of semiconductor, it is preferable that a p-type or an n-type of semiconductor is used which is manufactured by doping with elements from group III or group V of the periodic table, since such a semiconductor lowers the activation energy.

The thickness of the semiconductor layer to be used for the present invention is normally in the range of 0.3 to 5 $\mu$m. Preferably, it is in the range of 0.5 to 2 $\mu$m since the laminated layer is liable to become uniform with a small number of pinholes.

As to the material of the substrate whereon a semiconductor to be used for the present invention is laminated, any material is acceptable on condition that it has heat resistance ability in a degree to bear the temperature whereby the substrate is treated during the manufacturing and heat treatment, and that it transforms in accordance with the strain of the object to be measured. The examples of the material are, for instance, heat resistance polymer films such as a film of polyimide, a film of polyparabanic acid and a Q film; and metal foils of which surfaces are insulated. However, the material is not limited to the examples. Among the above-mentioned materials, films of heat resistance polymer such as polyimide are preferable, since the surface characteristics are excellent and the bending resistance is small. Further, a polyimide film is more preferable.

As to the thickness of the substrate, there is no limitation on condition that the strain of the object to be measured can be transferred to the semiconductor. However, from the point of flexibility, the thickness is preferably under 200 $\mu$m, and more preferably in the range of 75 to 5 $\mu$m.

Also, as to the roughness of R of the surface of the substrate, there is no limitation. However, Rmax is preferably under 200 Å, and more preferably under 150 Å from the view point of obtaining uniform a semiconductor.

Further, it is preferable that the roughness of the substrate is made small and the smoothness of the substrate is heightened since dispersion of the characteristics of the strain sensor of the present invention is reduced.

As above-mentioned, the semiconductor to be used for the present invention is laminated on a substrate of about 150 to about 300 Å in thickness by a glow discharge method, micro-wave discharge method, DC discharge method and the like in a vacuum normally under 5 Torr with at least one of H compound or F compound of Si, H compound or F compound of Ge, and H compound or alkyl compound of Sn; and dopant from Group III or Group V of the period table. The obtained semiconductor is an amorphous semiconductor which contains Si containing normally H or F in the range of about 3 to about 20% by atom, wherein the activation energy obtained from the temperature dependency of dark conductivity is under 15 meV. The non-single crystal semiconductor is normally in an amorphous state or in an amorphous state containing micro-crystals.

Here below is explained a strain sensor of the present invention based on an embodiment.

A strain sensor is made by forming at least two electrodes on the above-mentioned semiconductor, and the obtained strain sensor is attached to the measuring point. The measurement of strain is carried out by measuring the change of resistance, or the change of voltage while a constant current is given to the strain sensor.

FIG. 1 is an explanatory illustration of an embodiment of a strain sensor of the present invention.

In FIG. 1, a non-single crystal semiconductor 2 is laminated on a substrate comprising a base film of 25 $\mu$m thickness, and a pair of electrodes 3 and 4, and another pair of electrodes 5 and 6 are arranged in a way that the former crosses at right angles with the latter. With the electrodes 3 and 4, strains having a direction shown by arrow Y can be measured. Also, with the electrodes 5 and 6, strains having a direction shown by arrow X can be measured. Accordingly, with a strain sensor as shown in FIG. 1, strains having directions shown by arrows X and Y can be measured simultaneously, too.

INDUSTRIAL APPLICABILITY

As mentioned above, the strain sensor of the present invention has benefits that:

no amplifier is required for amplification since the absolute value of the gage ratio of G is large;

no thermal compensation is required because of the small influence against the value of resistance by a change of temperature; and the strain sensor is applicable to measuring strains under a comparatively strong magnetic field since it is hardly influenced by the magnetic field.

We claim:

1. A strain sensor comprising: a non-single crystal semiconductor containing Si, wherein activation energy, determined from the relationship between temperature and dark conductivity, is equal to or less than 15 meV.

2. A strain sensor according to claim 1, wherein the semiconductor contains at least one element selected from a group of semiconductor material, such as Ge and Sn except for the semiconductor material Si.

3. A strain sensor according to claim 1 or claim 2, wherein activation energy determined from the relationship between temperature and dark conductivity is equal to or less than 8 meV.

4. A strain sensor according to claim 1 or claim 2, wherein the semiconductor contains at least one element selected from the group consisting of H and F.

5. A strain sensor according to claim 1 or claim 2, wherein the type of the semiconductor is a p-type or an n-type.

6. A strain sensor according to claim 1 or claim 2, wherein a substrate of the semiconductor is a smooth polyimide film of which the maximum surface roughness is equal to or less than 200 Å.

7. A strain sensor according to claim 1 or claim 2, wherein 5 to 90% by a volume of the semiconductor is crystalline.

8. A strain sensor according to claim 7, wherein 5 to 25% by the volume of the semiconductor is crystalline.

* * * * *